3,449,064
PROCESS FOR PREPARING INDIUM AND
SCANDIUM ANTIMONATES
Gerhard Bayer, Hinteregg, Zurich, Switzerland, assignor, to Owens-Illinois, Inc., a corporation of Ohio
No Drawing. Filed June 24, 1963, Ser. No. 290,176
Int. Cl. C22b 59/00
U.S. Cl. 23—20                                    4 Claims This application is a continuation-in-part of both Ser. No. 164,592, filed Jan. 5, 1962, and Ser. No. 138,300, filed Sept. 15, 1961, both now abandoned.

This invention relates to a new rutile-type crystalline compound. More specifically, the invention relates to antimonates, $ASbO_4$, wherein the A ion has a valence of 3 and the antimony a valence of 5 where A is In or Sc, and to a method for preparation of such compounds.

Rutile-type compounds can be classified into three groups: $A^{4+}O_2$, $A^{3+}B^{5+}O_4$, and $A^{2+}B^{5+}O_6$. The prototype $A^{4+}O_2$ compound is rutile $TiO_2$. It is already known that $A^{3+}Sb^{5+}O_4$ compounds have the rutile-type crystalline structure with distribution of $A^{3+}$ and $Sb^{5+}$ ions in the rutile cell, in the case of $A^{3+}$ ions having a radius between about 0.55 and 0.75 A. This means that the $A^{3+}$ ions must have a coordination number of 6. Such cations include $Al^{3+}$, $Ga^{3+}$, $Cr^{3+}$, $Fe^{3+}$, and $Rh^{3+}$, and indeed the compounds $AlSbO_4$, $GaSbO_4$, $CrSbO_4$, $FeSbO_4$, and $RhSbO_4$ are known to have the rutile-type structure (Brandt K., X-ray Studies on $ABO_4$-compounds of the Rutile Type and $AB_2O_6$-compounds of the Columbite Type, Arkiv Kemi, Minerol., Geol. 15B (No. 4), 1–8 (1941).

According to the invention, it has been surprisingly discovered that the compounds indium antimonate, $InSbO_4$, and scandium antimonate, $ScSbO_4$, can exist and be prepared as rutile-type compounds. This is unexpected and unusual since the ionic radii of $In^{3+}$ and of $Sc^{3+}$ are quite large (0.81 A.) and differ so much from that of $Sb^{5+}$ (0.62 A.). Indeed, it has been found to be exceedingly difficult to prepare these compounds by the usual method of compacting finely-divided indium oxide or scandium oxide with antimony oxide and carrying out a high temperature solid state reaction in an oxidizing atmosphere. Although I have prepared the compounds in this manner, it has not been possible to prepare the compounds in pure form by this method.

The best method yet found to obtain complete reaction to the indium or scandium antimonate is to prepare a solution of an indium or scandium salt which is decomposable to the $A_2O_3$ oxide ($In_2O_3$ or $Sc_2O_3$) in an oxidizing atmosphere, evaporate the salt to dryness, intimately admix the salt with a finely-divided antimony oxide, compact the mixture, and slowly heat the mixture in an oxidizing atmosphere to decompose the salt to $A_2O_3$, and continue heating the mixture to a temperature above 900° C. (for $InSbO_4$) or above 950° C. (for $ScSbO_4$) until said $ASbO_4$ rutile-type compound is formed. Final treatment temperatures are usually from 900° C. to about 1150° C. for $InSbO_4$ and from 950° C. to about 1200° C. for $ScSbO_4$.

The compound $In^{3+}Sb^{5+}O_4$ was prepared in substantially pure form by dissolving the calculated stoichiometric amount of metallic indium in nitric acid, evaporating to dryness, and intimately mixing the indium nitrate resulting from this procedure with an equimolar portion of $Sb_2O_3$ in finely-divided form, compacting and heating slowly up to 500° C. until the decomposition of the nitrate to the oxide was complete; thereafter, the mixture was cooled, ground and compacted and heated in an oxidizing atmosphere for 4 hours at 750° C., 4 hours at 850° C., and finally for 20 hours at 1000° C. The slow heating at the intermediate temperatures was for the purpose of oxidizing the $Sb_2O_3$ to $Sb_2O_5$. X-ray powder diffraction data showed that the reaction between $In_2O_3$ and $Sb_2O_5$ started at about 900° C. and was complete at 1000° C.

The X-ray powder diffraction data of the new compound show a striking similarity to those of another rutile-type compound, $SnO_2$, the unit cell dimensions for both compounds being practically identical:

| $InSbO_4$ | $SnO_2$ |
|---|---|
| $a_0 = 4.74$ A | $a_0 = 4.74$ A |
| $c_0 = 3.215$ A | $c_0 = 3.19$ A |
| $c_0/a_0 = 0.678$ | $c_0/a_0 = 0.673$ |

Lattice spacings and intensities for both compounds are compared below:

| $InSbO_4$ | | | $SnO_2$ | | |
|---|---|---|---|---|---|
| d | $I/I_1$ | hkl | d | $I/I_1$ | hkl |
| 3.35 | 100 | 110 | 3.35 | 100 | 110 |
| 2.663 | 64 | 101 | 2.644 | 81 | 101 |
| 2.37 | 13 | 200 | 2.37 | 24 | 200 |
| 2.32 | 3 | 111 | 2.31 | 5 | 111 |
| 2.122 | 1 | 210 | 2.12 | 2 | 210 |
| 1.771 | 48 | 211 | 1.756 | 62 | 211 |
| 1.676 | 10 | 220 | 1.675 | 63 | 220 |
| 1.608 | 5 | 002 | 1.59 | 8 | 002 |
| 1.50 | 6 | 310 | 1.498 | 13 | 310 |
| 1.448 | 8 | 112 | 1.439 | 17 | 112 |
| 1.419 | 8 | 301 | 1.41 | 15 | 301 |
| 1.331 | 4 | 202 | 1.32 | 7 | 202 |
| 1.218 | 6 | 321 | 1.21 | 11 | 321 |
| 1.185 | 1 | 400 | 1.16 | 3 | 400 |
| 1.16 | 3 | 222 | 1.155 | 8 | 222 |
| 1.118 | 2 | 330 | 1.117 | 3 | 330 |
| 1.097 | 4 | 312 | 1.09 | 8 | 312 |
| 1.082 | 3 | 411 | 1.08 | 8 | 411 |
| 1.061 | 2 | 420 | 1.06 | 3 | 420 |
| Z=1 | | | Z=2 | | |

The density for the new compound, calculated from X-ray data, is 6.89 gms./cc.

The foregoing X-ray data show that no substantial indium oxide or antimony oxide remains in the product. They also confirm that the valence of the Sb ion is +5.

The new compound of the invention is stable in oxidizing atmosphere at least up to 1150° C.

The volume resistivity of the compounds are surprisingly much lower than $SnO_2$. For instance, the volume resistivity of a sample of $InSbO_4$ was of the order of about 2 ohm-cm. at room temperature. The materials of the invention are useful as semiconductors or resistance elements for electronic circuits.

In a specific example of the preferred method the compound $Sc^{3+}Sb^{5+}O_4$ is prepared in substantially pure form by dissolving the calculated stoichiometric amount of metallic scandium in nitric acid, evaporating the resulting aqueous nitric acid solution of scandium nitrate to dryness, and intimately mixing the scandium nitrate resulting from this procedure with an equimolar portion of $Sb_2O_3$ in finely-divided form, compacting and heating slowly up to 500° C. until the decomposition of the nitrate to the oxide is complete; thereafter, the mixture is cooled, ground and compacted and heated in an oxidizing atmosphere for 4 hours at 750° C., 4 hours at 850° C., and finally for 20 hours at 1050° C. The slow heating at the intermediate temperatures is for the purpose of assuring oxidation of the $Sb_2O_3$ to $Sb_2O_5$. X-ray powder diffraction data show that the reaction between $Sc_2O_3$ and $Sb_2O_5$ starts at about 950° C. and is complete at 1050° C.

In another method finely-divided powders of $Sc_2O_3$ and $Sb_2O_3$ were intimately admixed in equimolar ratios, compacted and slowly heated in an air atmosphere to 1050° C., and held at this temperature for 10 hours. Reaction to form $ScSbO_4$ started at about 950° C.

The X-ray powder diffraction data of the new compound were as follows:

| ScSbO₄ |
| --- |
| $a_0 = 4.705$ Å |
| $c_0 = 3.17$ Å |
| $c_0/a_0 = 0.673$ |

$d$-values and relative intensities for both the compounds are shown below. The agreement between calculated and experimental values was perfect.

| ScSbO₄ | | |
| --- | --- | --- |
| d | I/I₁ | hkl |
| 3.326 | 100 | 110 |
| 2.625 | 67 | 101 |
| 2.352 | 16 | 200 |
| 2.295 | 7 | 111 |
| 2.098 | 3 | 210 |
| 1.753 | 63 | 211 |
| 1.662 | 13 | 220 |
| 1.585 | 5 | 002 |
| 1.477 | 9 | 310 |
| 1.431 | 11 | 112 |
| 1.405 | 13 | 301 |
| 1.314 | 4 | 202 |
| 1.207 | 6 | 321 |
| 1.176 | 2 | 400 |
| 1.148 | 6 | 222 |
| 1.109 | 2 | 330 |
| 1.085 | 4 | 312 |

The foregoing X-ray data confirm the rutile structure of the compound and that the valence of the Sb ion is +5, as well as the emperical formula of the compound.

The new compound ScSbO₄ is stable in oxidizing atmosphere at least up to 1150° C.

The new compounds, when finely-ground, also have good hiding power in paint formulations, for example, as follows:

| Ingredient: | Lbs. |
| --- | --- |
| InSbO₄ or ScSbO₄ | 300 |
| Zinc oxide | 25 |
| Long-oil soya alkyd resin (60% nonvolatile) | 480 |
| Mineral spirits | 181 |
| Cobalt naphthenate (6% Co) | 3 |
| Lead naphthenate (24% PbO) | 3 |
| Calcium naphthenate (4% Ca) | 2 |
| Total | 994 |

As will be evident to those skilled in the art, various modifications of the invention can be made or followed in the light of the foregoing disclosure and discussion without departing from the spirit and the scope of the disclosure or from the scope of the claims.

I claim:

1. A method of preparing a rutile-type crystalline compound having the formula InSbO₄ which comprises preparing a solution of an indium salt which is decomposable to In₂O₃ in an oxidizing atmosphere, evaporating the salt to dryness, intimately admixing the indium salt with an Sb₂O₃ compacting the mixture, and slowly heating the mixture in an oxidizing atmosphere to decompose the indium salt to In₂O₃, and continuing heating of the mixture to a temperature above about 900° C. to about 115° C. until said InSbO₄ rutile-type compound is formed, the ratio of said indium salt and said Sb₂O₃ being sufficient to form the compound InSbO₄.

2. A method of preparing a rutile-type crystalline compound having the formula ScSbO₄ which comprises preparing a solution of a scandium salt which is decomposable to Sc₂O₃ in an oxidizing atmosphere, evaporating the salt to dryness, intimately admixing the scandium salt with Sb₂O₃, compacting the mixture, and slowly heating the mixture in an oxidizing atmosphere to decompose the scandium salt to Sc₂O₃, and continuing heating of the mixture to a temperature above about 950° C. to about 1200°C. until said ScSbO₄ rutile-type compound is formed, the ratio of said scandium salt and said Sb₂O₃ being sufficient to form the compound ScSbO₄.

3. A method of preparing a substantially pure form of rutile-type crystalline InSbO₄, the steps comprising evaporating to dryness a solution of indium nitrate, mixing the dried indium nitrate with Sb₂O₃ to form a finely divided mixture, compacting the mixture, heating the mixture slowly up to about 500° C. until the decomposition of the indium nitrate to the indium oxide is substantially complete, cooling the mixture, grinding the mixture and heating the mixture in an oxidizing atmosphere up to a temperature of about 900° C. to 1150° C. until the rutile type crystalline InSbO₄ is formed, the ratio of the indium nitrate to Sb₂O₃ being sufficient to form the compound InSbO₄.

4. A method of preparing a substantially pure form of rutile-type crystalline ScSbO₄, the steps comprising evaporating the dryness a solution of scandium nitrate, mixing the dried nitrate in a finely divided form with Sb₂O₃ in a finely divided form to form a mixture, compacting the mixture, heating the mixture up to as high as about 500° C. until the decomposition of the scandium nitrate to the scandium oxide is substantially complete, cooling the mixture, grinding the mixture and heating the mixture in an oxidizing atmosphere up to a temperature of about 950° C. to about 1200° C. until the rutile type crystalline ScSbO₄ is formed, the ratio of the scandium nitrate to Sb₂O₃ being sufficient to form the compound ScSbO₄.

References Cited

UNITED STATES PATENTS

| 1,211,564 | 1/1917 | Eyer | 23—53 |
| 3,022,186 | 2/1962 | Hund | 106—303 X |

OTHER REFERENCES

Mellor (I), Comprehensive Treatise On Inorganic and Theoretical Chemistry, vol. 5 (1924), p. 485, 488, 493, 494, published by Longmans, Green & Co., N.Y. Copy in Group 110 (QD 31 M4).

Mellor (II), Comprehensive Treatise On Inorganic and Theoretical Chemistry, vol. 9 (1929); p. 457, published by Longmans, Green & Co., N.Y. Copy in Group 110 (QD 31 M4).

Pascal, Nouveau Triate de Chemie Minerals, Tome XI, Masson et cie, Editeurs, Paris, 1958, p. 610. Copy in Group 110 (QD 151 p32 1956).

Hampel, Rare Metals Handbook, published by Reinhold Publishing Corp., N.Y. 1954, p. 201. Copy in Group 110 (TA 459 H 28 C. 3).

HERBERT T. CARTER, *Primary Examiner.*

U.S. Cl. X.R.

23—21, 53